Nov. 30, 1954   A. M. CHAMBERS, JR., ET AL   2,695,799
MECHANICAL SEAL
Filed Sept. 29, 1952
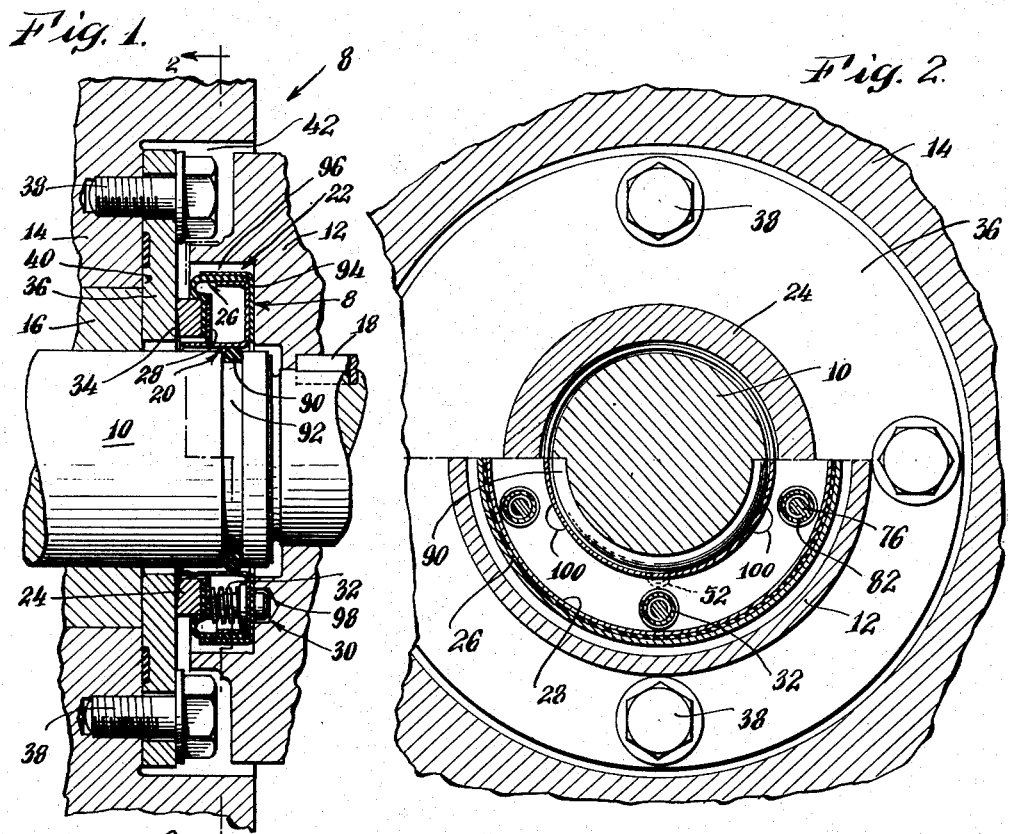
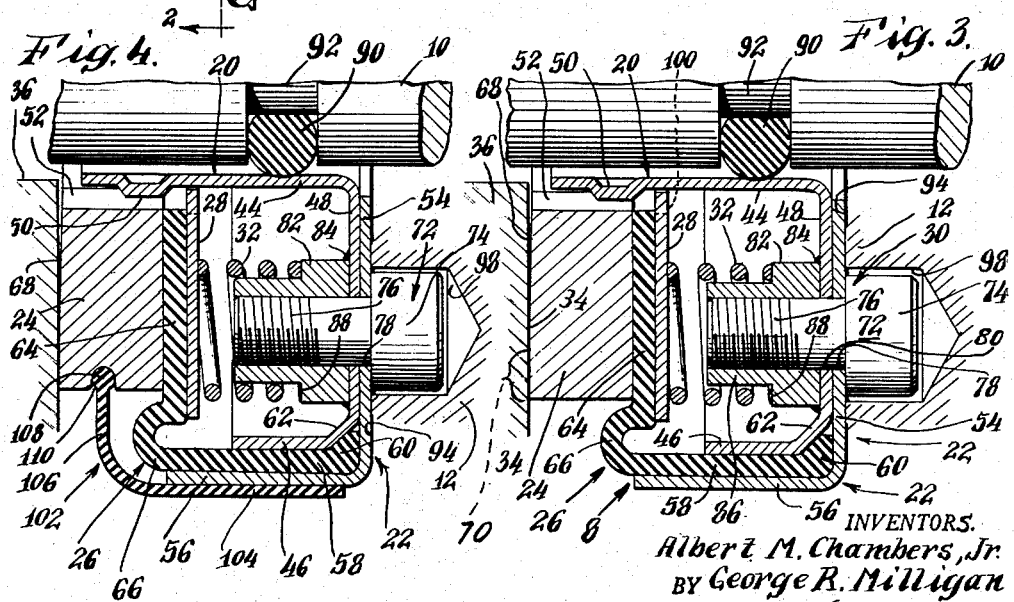
INVENTORS.
Albert M. Chambers, Jr.
BY George R. Milligan
Robert Henderson
ATTORNEY.

United States Patent Office

2,695,799
MECHANICAL SEAL

Albert M. Chambers, Jr., and George Robert Milligan, Palmyra, N. Y., assignors to The Garlock Packing Company, Palmyra, N. Y., a corporation of New York Application September 29, 1952, Serial No. 312,154

10 Claims. (Cl. 286—11)

The present invention relates to mechanical seals for effecting a fluid seal between two relatively rotatable machine elements such as a shaft and a machine-casing opening through which the shaft extends.

An important object of the invention is the provision of such a sealing device which will effectively seal a shaft bearing against the loss of fluid lubricant therefrom and which, also, is so constructed as to exclude dirt or other foreign matter both from said bearing and from the interior of the sealing device, and, more particularly, from operative parts, such as a spring or springs located within the device.

Another important object is the provision of a sealing device with multi-purpose nut and bolt parts which, in addition to their common function of securing parts of the device together, function, also, to retain springs of the device in place and to constrain the device to non-rotation relatively to a related machine part.

The foregoing and other more or less obvious objects are accomplished by the present invention of which only two of numerous embodiments are illustrated in the drawing without, however, limiting the invention to the particular disclosed structures.

In the drawing:

Figure 1 is a fragmentary longitudinal or axial sectional view of a preferred embodiment of this invention associated with relatively rotatable machine elements for providing a dust or fluid seal between such machine elements; only adjacent, fragmentary portions of said machine elements being shown.

Fig. 2 is a transverse or radial sectional view substantially on the irregular, broken line 2—2 in Fig. 1.

Fig. 3 is an enlarged view of a portion of Fig. 1, additionally sectionalized to show further details.

Fig. 4 is an enlarged view, generally similar to Fig. 3, but illustrating one of a number of possible modifications of the invention.

Figs. 1–3, inclusive, illustrate a new and improved seal 8 according to the present invention fixedly associated with a non-rotatable shaft 10 and shaft-supporting arm 12, for effecting a sliding seal between said shaft and arm and a rotatable hub 14 which is supported on the shaft by a bearing 16 which may be either sleeve-type as shown or an anti-friction bearing. It is well understood that, in some structures, the hub or comparable part 14 may be stationary and the shaft may be rotatable. It should also be understood that a seal according to this invention, alternatively, may be fixed to the hub and effect a sliding seal with the shaft; and the two alternatives may be employed irrespective of whether the rotating element is the shaft or the hub or comparable part.

The disclosed structure may be considered as representing means for supporting an articulated caterpillar track (not shown) which passes partially around or under a relatively small wheel the hub of which is hub 14. The non-rotatable shaft 10 is restrained against rotation by being keyed as at 18 within the shown lower end of the shaft-supporting arm 12 which is integrated with a body or truck bolster of a vehicle (not shown) such as a bulldozer, military tank, or other vehicle.

Such vehicles commonly are used upon relatively rough ground and, hence, a difficulty is presented by the tendency of dust, or particles or lumps of earth material to find their way to the bearing 16. Such foreign matter, understandably, would cause material damage to the bearing. The bearing, also, would be damaged or impaired as to operation, if lubricant therein were to escape to any material extent.

Such ingress of dirt or loss of lubricant is prevented by the seal 8 which comprises inner and outer, annular shell members 20 and 22 respectively, which are generally L-shaped in radial-axial section and are so nested as to provide a composite shell which is generally U-shaped in radial-axial section with its open side facing axially. The seal also includes a wear or sealing ring or nose 24, an annular, flexible sealing element 26 for sealing the ring 24 to the composite shell, a flat, annular, metal washer 28, plural nut and bolt assemblies 30 adapted, primarily, to bolt together the shell members 20 and 22, and plural coil springs 32 for urging the sealing ring 24 into sliding sealing association with a face 34 of an annular retaining ring 36 which also serves as a wear ring. The ring 36 is held by bolts 38 against the bottom surface 40 of an annular recess 42 formed in the hub 14 and also against the adjacent end of the bearing 16 to retain the latter in place in the hub.

The inner shell member 20, preferably, is pressed to shape from suitable flat sheet metal to give it an inner cylindrical flange 44, an outer cylindrical flange 46 which may be somewhat narrower, axially, than flange 44 and an intervening flat web 48 constituting a rigid interconnection for the flanges 44 and 46. The inner flange 44 has one or more, but preferably at least three, similar, equidistant projections 50 formed therein (only one being shown in the drawing), extending slidably into mating axial slots 52 formed in the inner cylindrical face of the sealing nose 24 to restrain the latter against rotation relatively to the shell. The projections 50 serve another purpose hereinafter explained.

The outer shell member 22 has a flat bottom or web 54 which seats against the outer surface of web 48 of the inner shell member. The shell member 22 also has a cylindrical flange 56 which is spaced radially outwardly of flange 46 of the inner shell member to receive therebetween a cylindrical skirt 58 of the flexible sealing element 26. This skirt fits quite accurately but not too tightly between the shell flanges 46 and 56, and at its free edge is formed with a bead 60 which is held tightly in an annular space partly defined by an oblique or frustoconical wall 62 joining web 48 and cylindrical flange 46 of the inner shell member and defined also by adjacent portions of web 54 and flange 56 of the outer shell member.

The flexible sealing element 26, preferably, is molded of relatively soft rubber, synthetic rubber or other suitable material, and has a flat, annular portion 64 in face-to-face association with the adjacent back end of the sealing ring 24 and preferably bonded thereto; and also an annular, rolling or flexing web 66 joining the skirt 58 and the portion 64.

The sealing ring 24 may be of any suitable material enabling its outer end face 68 to effect a satisfactory sliding seal with the surface 34 of the wear ring 36. Thus, the ring 24 may be of a suitable metal such as bronze, and the ring 36 may be of a somewhat harder metal. The face 68 may advantageously be in the form of a very flat frusto-cone so that it is slightly angular relatively to surface 34 as viewed in section as in Fig. 3. In this condition, the outer marginal, annular area of surface 68, indicated by bracket 70 in Fig. 3, may initially be lapped to the opposed area of surface 34, and as a result of wear occurring during operation of the device, the lapped areas of the two mentioned surfaces will gradually become enlarged and increase or at least maintain a very effective seal therebetween.

The nut and bolt assemblies which function primarily to hold the two shell members together each comprise a bolt 72 having a head 74 and a stem or shank 76 extending through a bolt hole 78 in web 54 of the outer shell member and thence through an aligned bolt hole 80 in web 48 of the inner shell member with its end threaded into a nut 82 which is fixed to the inner face of web 48, as, for example, by weld 84. The bolt head 74 may have either its exterior or an end recess of hexagonal or other non-circular form to enable the bolt to be tightened with a wrench or other suitable tool.

The outer end of the nut 82 may be cut away or initially formed to provide it with an end portion 86 of considerably reduced diameter, an annular shoulder 88 defining the juncture of this reduced portion with the remainder of the nut. The inner end of spring 32 encircles the reduced portion of the nut and seats upon the shoulder 88 while the outer end seats upon the washer 28. As the spring is under compression, it, with similar springs arranged in a circumferential series about the device, operates to urge the sealing ring or nose 24 into sliding sealing engagement with the wear ring 36 and to maintain such engagement. It is preferred to provide a circumferential series of at least three equidistant nut, bolt and spring assemblies about the device.

The washer 28, preferably, is bonded to the adjacent inner face of the flat, annular portion 64 of the flexible sealing element. Its inside diameter, preferably, is only slightly greater than the normal outside diameter of flange 44 of the inner shell member but is somewhat smaller than an imagined circle intersecting the radially innermost surfaces of the projections 50. Thus, the latter constitute abutments which normally limit outward axial movement of the washer 28, thereby maintaining the unity of the device.

The entire sealing device 8 may be slid axially upon the shaft 10 and sealed in relation thereto by suitable packing means as, for example, an O ring 90 of relatively soft rubber or rubber-like material, seated within an annular groove 92 formed in the shaft and radially compressed against the adjacent inner wall of flange 44 of the inner shell member. In thus installing the sealing device, the web 54 may be pushed tightly against bottom wall 94 of an annular recess 96 provided for the sealing device in the inner side of the arm 12, and the compressive force of the springs 32 aids in maintaining such tight seating of the sealing device against the bottom wall of said recess. Bores 98 may be provided in the wall 94 in axial alignment with the several bolt heads 74, to receive the latter and to coact therewith to prevent rotation of the sealing device relatively to the arm 12 and the shaft.

In assembling the sealing device, the shell members may first be formed with the projections 50 and bolt holes 78 and 80, all as shown in the drawing. Then the nuts 82 may be welded in place and the springs 32 placed thereover. The flexible sealing element 26, with ring 24 and washer 28 suitably bonded thereto, may then be moved axially into its illustrated position relatively to the inner shell member. Because of the described inside diameter of the washer 28, the latter, normally, cannot pass inwardly beyond the projections 50, but the washer may be formed with at least one notch 100 of sufficient radial dimension that, with said notch in axial alignment with one of the projections 50 to enable that part of the washer to axially pass that projection, the washer may be tilted to permit it to axially pass the other projections 50. After the washer has passed inwardly beyond said projections, the washer and all parts bonded thereto may be rotated to misalign the notch or notches 100 relatively to the projections 50 so that the notches, thereafter, will not interfere with the functioning of the washer for unifying the device. If desired, there may be as many notches 100 as projections 50 so that the assembly operation, just described, may be performed without tilting of the washer 28 and the parts bonded thereto. In such an arrangement, the same misalignment of the notches and projections would be effected to assure the continued unity of the parts of the device.

Approximately concurrently with the described moving of the washer 28 into place, the skirt 58 is sleeved over the flange 46 of the inner shell member, a suitable lubricant being employed to aid this operation if needed. Thereafter, with the then-assembled parts suitably supported, the outer shell member 22 is slid axially in place with its flange 56 closely surrounding the skirt 58 of the flexible sealing element, a suitable lubricant again being used, if needed, in this operation. Finally, the bolts 72 are inserted and tightened.

It may be observed that lubricant, tending to escape from the bearing 16, would be sealed off by the coaction of the sealing ring or nose 24 with the wear ring 36 and also by the O ring 90. Any dirt or foreign matter tending to work its way through recess 42 toward the seal and the bearing would be sealed off by the sealing ring 24, the flexible web 66 of the flexible sealing member, the tight contact of the shell with the wall 94 and by the O ring 90.

The embodiment illustrated in Fig. 4 differs from that hereinbefore described in detail chiefly in the provision of a supplemental, annular, flexible sealing element 102. This supplemental element may be of relatively soft, flexible rubber or rubber-like material and has an outer skirt 104 sleeved over and preferably cemented or otherwise bonded to cylindrical flange 56 of the outer shell member. The supplemental sealing element also has an integral, radially inwardly extending, flexible web 106 terminating at its inner periphery in an enlarged circular bead 108 which is contracted into an annular groove 110 formed in the exterior of the sealing nose 24. The normal or unstressed internal diameter of the bead 108, preferably, is less than the diameter of the groove 110 at the bottom of the latter so that the resiliency of the material of said bead serves to hold the latter contracted tightly within said groove.

Obviously, the supplemental flexible element serves not only to keep dirt from the seal but also to prevent dirt from lodging so tightly about the web 66 as to prevent free flexing and rolling of the latter in operation. Because of its larger diameter the supplemental element 102, in operation, need not pursue the same type of rolling action as the web 66; therefore, the presence of dirt adjacent to the supplemental element would have little or no harmful effect.

It should be apparent that the present inventive concept may be employed in various structures other than those illustrated and described herein without, however, departing from the invention as set forth in the following claims.

We claim:

1. A sealing device for effecting a seal between two coaxial, relatively rotatable machine elements, comprising an annular, U-shaped shell, adapted for fixed sealing association with one of said machine elements, which shell comprises two intertelescoping shell members having individual radial portions in face-to-face relationship and individual cylindrical flanges defining the radial limits of an interior space, a rigid sealing ring which, with said radial shell member portions, defines the axial limits of said interior space, means within said space for yieldably urging the sealing ring away from said radial shell member portions and into sliding sealing engagement with a surface associated with the other of said machine elements, an annular, flexible sealing element having a flexible web, a portion at one side of said web in fixed sealing association with said rigid sealing ring and a cylindrical skirt at the opposite side of said web, and means, independent of the flexible sealing element, for holding the two shell members against relative movement; one of said shell members having a second cylindrical flange, integral with its said radial portion, and in relatively closely spaced parallelism with the other shell member's cylindrical flange, and the said skirt being sealingly confined between the two last-mentioned cylindrical flanges.

2. A sealing device for effecting a seal between two coaxial, relatively rotatable machine elements, comprising an annular, U-shaped shell, adapted for fixed sealing association with one of said machine elements and having two cylindrical flanges, substantially spaced apart radially, and a radial portion interconnecting the two said flanges at corresponding ends thereof, a rigid sealing ring intermediate the other ends of said flanges, spring means within the shell, compressed between said radial shell portion and said sealing ring to urge the latter into sliding sealing engagement with a radial surface associated with the other of said machine elements, an annular, flexible sealing element sealingly interconnecting said sealing ring and one of said cylindrical flanges at the latter's said other end, and a supplemental, annular, flexible sealing element, in spaced relation to the first-mentioned flexible sealing element and in fixed sealing association with the rigid sealing ring and the said one cylindrical flange of the shell.

3. A sealing device for effecting a seal between two coaxial, relatively rotatable machine elements, comprising an annular, U-shaped shell, adapted for fixed sealing association with one of said machine elements and having two cylindrical flanges, substantially spaced apart radially, and a radial web interconnecting the two said flanges at corresponding ends thereof, a rigid sealing ring intermediate the other ends of said flanges, spring means within the shell, compressed between said radial web and said sealing ring to urge the latter into sliding sealing engagement with a radial surface associated with the other of said machine elements, and an annular, flexible sealing element sealingly interconnecting said sealing ring and one of said cylindrical flanges at the latter's said other end; the spring means comprising plural circumferentially arranged coil springs, the shell comprising two intertelescoping shell members having individual radial portions, in face-to-face relationship, constituting said radial web and said shell including circumferentially spaced nuts integrally associated with and protruding inwardly from said radial web and extending into adjacent ends of said springs to circumferentially space the latter, and the device further including bolts extending through said individual radial portions and threaded into said nuts to hold said intertelescoping members together.

4. A sealing device according to claim 3, wherein the said bolts have headed ends, at the exterior of the shell, adapted to seat within recesses associated with said one of the machine elements to prevent rotation of the device relatively to said one machine element.

5. A sealing device according to claim 3, wherein the said flexible sealing element has a cylindrical skirt, remote from the sealing ring, and said one of the cylindrical flanges comprises cylindrical walls of the intertelescoping shell members between which said skirt is closely retained.

6. A sealing device according to claim 5, wherein the said skirt has a continuous bead at its free edge held under compression between adjacent walls of the two intertelescoping shell members at the juncture of the shell's said radial portion and its said one cylindrical flange.

7. A sealing device for effecting a seal between two coaxial, relatively rotatable machine elements, comprising an annular, U-shaped shell, adapted for fixed sealing association with one of said machine elements, which shell comprises two intertelescoping shell members having individual radial portions in face-to-face relationship and individual cylindrical flanges defining the radial limits of an interior space, a rigid sealing ring which, with said radial shell member portions, defines the axial limits of said interior space, means holding said two shell members against relative movement, means within said space for yieldably urging the sealing ring away from said radial shell member portions and into sliding sealing engagement with a surface associated with the other of said machine elements, and an annular, flexible sealing element having a flexible web, a portion at one side of said web in fixed sealing association with said rigid sealing ring and a cylindrical skirt at the opposite side of said web; one of said shell members having a second cylindrical flange, integral with its said radial portion, and in relatively closely spaced parallelism with the other shell member's cylindrical flange, and the said skirt extending between and in contact with both the two last-mentioned cylindrical flanges and having a bead at its free end tightly compressed between and at the juncture of the two last-mentioned cylindrical flanges and the said radial shell member portions.

8. A sealing device according to claim 7, further including a supplemental, annular, flexible sealing element, in spaced relation to the first-mentioned flexible sealing element and having a continuous bead at one margin thereof, fixedly seated within an annular groove in the rigid sealing ring, and a cylindrical skirt at the opposite margin thereof in fixed, face-to-face sealing association with the one of the said two last-mentioned cylindrical flanges which is radially remote from said interior space and with the surface of the last-mentioned one cylindrical flange which is radially remote from the cylindrical skirt of the first-mentioned flexible sealing element.

9. A sealing device for effecting a seal between a shaft and a structure surrounding said shaft, which shaft and structure are relatively rotatable, the device comprising a U-shaped, annular shell adapted for fixed sealing association with the shaft with the open part of the U facing axially, a rigid sealing ring at the open part of the U, a flexible, annular sealing element effecting a seal between the sealing ring and a radially outer portion of the shell, an annular abutment member fixedly associated with the inner end of the sealing ring, and plural, circumferentially arranged springs within the shell and pressing axially against said abutment member to urge the sealing ring into sliding sealing association with a radial surface associated with the said surrounding structure; the shell comprising rigidly interconnected, intertelescoping shell members one of which is L-shaped and has a radial portion and a cylindrical flange at the outer periphery of said radial portion and the other of which is U-shaped and has a radial portion in face-to-face association with the radial portion of said L-shaped shell member, an inner cylindrical flange at the inner periphery of the said other shell member's radial portion, and a cylindrical flange at the outer periphery of the radial portion of said U-shaped shell member in radial alignment with the cylindrical flange of said L-shaped shell member, the said flexible sealing element having a cylindrical skirt retained between and in fixed sealing association with said cylindrical flange of the L-shaped shell member and the outer cylindrical flange of the U-shaped shell member; the sealing ring having inner axial grooves and the inner cylindrical flange of the shell having projections extending radially outwardly therefrom and slidably into said grooves; and the abutment member having portions adjacent to the inner ends of said grooves in axial alignment with said projections for retaining the parts of the device together as a unit.

10. A sealing device according to claim 9, further including a supplemental, outer, flexible sealing element having a continuous bead, at one margin, seated within an external annular groove in the rigid sealing ring and a skirt at its other margin extending tightly about an external surface of the shell.

References Cited in the file of this patent

UNITED STATES PATENTS

| Number | Name | Date |
| --- | --- | --- |
| 2,406,686 | Hobbs | Aug. 27, 1946 |
| 2,497,704 | Voytech | Feb. 14, 1950 |
| 2,613,960 | Nelson | Oct. 14, 1952 |